United States Patent
Noguchi et al.

(10) Patent No.: US 10,831,570 B2
(45) Date of Patent: Nov. 10, 2020

(54) AUTO-SAVING DATA FOR SINGLE PAGE APPLICATION

(71) Applicant: International Business Machines Corporation, Armonk, NY (US)

(72) Inventors: Atsushi Noguchi, Funabashi (JP); Akiko Matsuoka, Meguro-ku (JP); Lu Zheng, Tokyo (JP); Naoko Rikiyama, Sumida-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/372,726

(22) Filed: Apr. 2, 2019

(65) Prior Publication Data
US 2020/0319943 A1 Oct. 8, 2020

(51) Int. Cl.
*G06F 9/54* (2006.01)
*G06F 9/445* (2018.01)
*G06F 11/34* (2006.01)
*G06F 11/30* (2006.01)

(52) U.S. Cl.
CPC .......... *G06F 9/543* (2013.01); *G06F 9/44505* (2013.01); *G06F 11/3024* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 7,882,072 B1 | 2/2011 | Axe | |
| 2010/0017695 A1* | 1/2010 | Palmieri | G06F 16/95 715/205 |
| 2017/0048339 A1 | 2/2017 | Straub | |
| 2017/0169072 A1 | 6/2017 | Crawford | |

* cited by examiner

*Primary Examiner* — Craig C Dorais
(74) *Attorney, Agent, or Firm* — Alexander G. Jochym

(57) ABSTRACT

One or more resources of a first computer device to monitor are determined based on a single page application of a second computer device. A value for each resource of the one or more resources is determined. A save command is issued to the save single page application based on the determined value of each resource of the one or more resources.

7 Claims, 5 Drawing Sheets

| Resource type | Value range | Acceptable upper limit | Current value | Safety rate | Modified Value |
|---|---|---|---|---|---|
| CPU | 0-100% | 90% | 85% | 10% | 93.5% |
| Memory | 0-100% | 80% | 70% | 5% | 73.5% |
| Network Inbound | 0-100% (Rate to the bandwidth limit according to the specification) | 70% | 55% | 20% | 66% |

FIG. 5A

| User ID (Key) | AuthN | SessionID | Session CreationTime | WebSocket ClientID | Last SaveTime |
|---|---|---|---|---|---|
| Usr01 | Y | zaq12wsx | T1 | 1 | T1.1 |
| Usr02 | Y | cde34rfv | T2 | 2 | T2.1 |

FIG. 5B

| Resource type | Value range | Acceptable upper limit | Acceptable lower limit | Current value | Safety rate | Modified Value |
|---|---|---|---|---|---|---|
| CPU | 0-100% | 90% | 20% | 80% | 10% | 88% |
| Memory | 0-100% | 80% | 15% | 65% | 15% | 74.75% |
| Network Inbound | 0-100% (Rate to the bandwidth limit according to the specification) | 70% | 10% | 40% | 20% | 48% |

FIG. 6A

| User ID (Key) | AuthN | SessionID | Session CreationTime | WebSocket ClientID | Current Save Interval |
|---|---|---|---|---|---|
| Usr01 | Y | zaq12wsx | T1 | 1 | 10 |
| Usr02 | Y | cde34rfv | T2 | 2 | 10 |

FIG. 6B

AUTO-SAVING DATA FOR SINGLE PAGE APPLICATION

BACKGROUND

The present invention relates generally to the field of web applications, and more particularly to auto-saving data in web applications.

A single page application (SPA) is a website or web application that allows a user to interact with the webpage and write information or data into the current web page without having to reload the entire page from the server. An SPA uses a type of code, such as HTML, JavaScript, or CSS, to load and retrieve the webpage. The user can dynamically add information to the webpage. In an SPA, most of the information stays the same while small amounts of information change. This allows for the load time to be a lot quicker for a user. Generally, new information for the SPA is loaded in small pieces.

SUMMARY

Embodiments of the present invention include a computer-implemented method, computer program product, and system for auto-saving data. In one embodiment, one or more resources of a first computer device to monitor are determined based on a single page application of a second computer device. A value for each resource of the one or more resources is determined. A save command is issued to the single page application based on the determined value of each resource of the one or more resources.

BRIEF DESCRIPTION OF THE DRAWINGS

FIGS. 5A and 5B are an example of a resource usage analysis table and a client status table respectively, in accordance with at least one embodiment of the invention.

FIGS. 6A and 6B are an example of a resource usage analysis table and a client status table respectively, in accordance with at least one embodiment of the invention.

DETAILED DESCRIPTION

Figure 1:
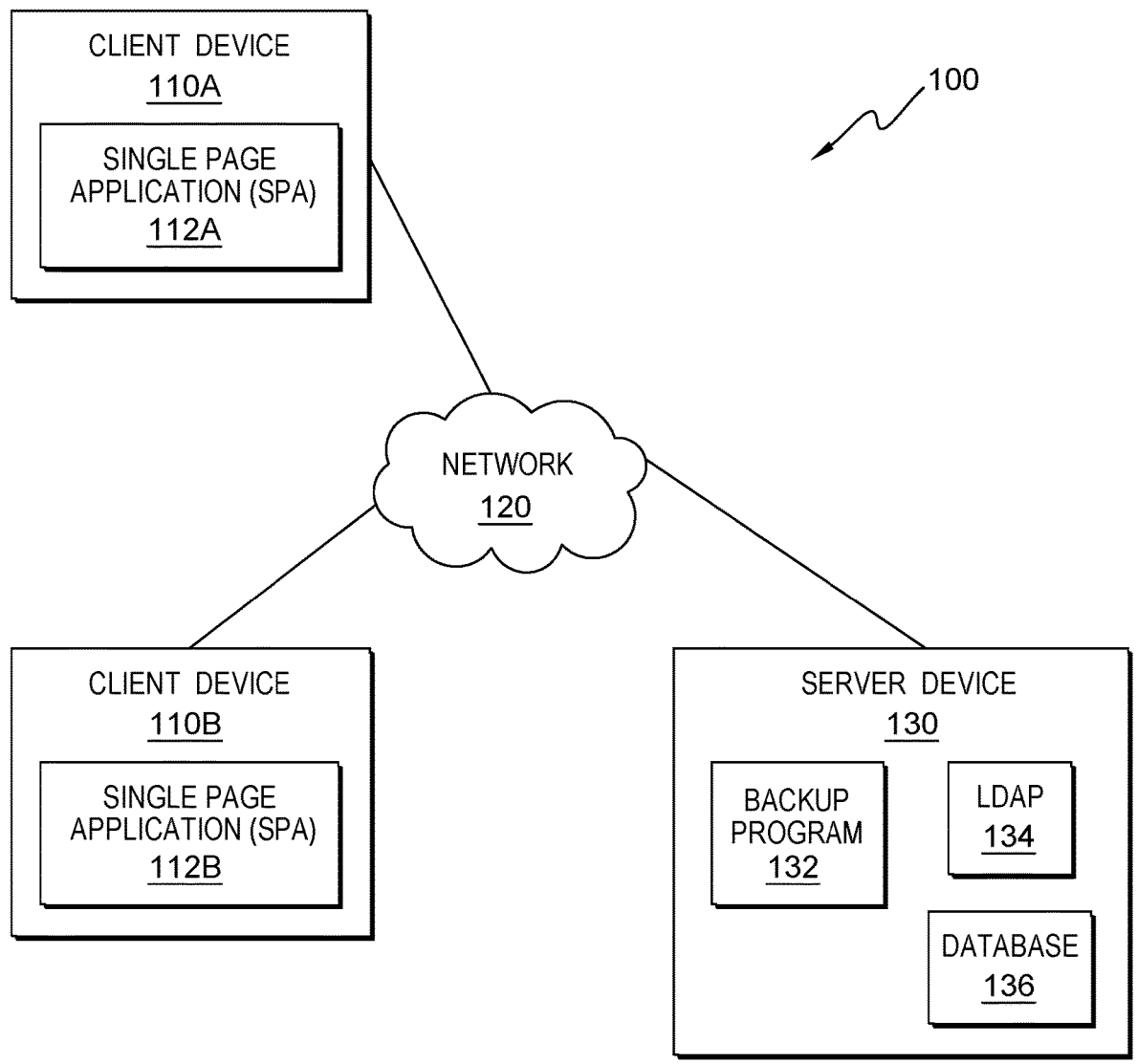
FIG. 1 is a functional block diagram of a network computing environment, generally designated 100, suitable for operation of backup program 132, in accordance with at least one embodiment of the invention.

Single page applications (SPAs) are web applications that operate in a web browser. When a user performs a save operation on the client side, data entered into the SPA is normally saved on the server side. However, when a user does not explicitly perform a save operation, data can be lost in the case of a fault on the web browser or the computing device running the web browser.

Embodiments of the present invention recognize that the function of auto-saving data entered into an SPA involves transmitting data to the server side to store the data. Embodiments of the present invention recognize that current auto-save features function in relation to the client device where data is entered, but the auto-save features do not relate to the server device where data is stored. Embodiments of the present invention recognize that a server device where data is stored often will be saving a large amount of data from multiple client devices. Embodiments of the present invention recognize that auto-saving data may have better performance when done at an optimal time for the server device and not necessarily at the optimal time of the client device. Embodiments of the present invention recognize that the optimal time for the server device may be related to resources of the server device.

Embodiments of the present invention provide for an SPA, such as SPA 112A or SPA 112B, and backup program 132. Embodiments of the present invention provide for login verification of a user into the SPA. Embodiments of the present invention provide for resource usage determination of a server device, a safety rate, and calculation of a modified resource usage based on the safety rate. Embodiments of the present invention do not require the use of a safety rate and the received resource usage can be used without any modification of the resource levels using a safety rate. Embodiments of the present invention provide for a forced save command, an issue save command, and an issue interval command based on login verification and resource usage. Embodiments of the present invention provide for transmission of the save command from backup program 132 to the client device with an SPA. Embodiments of the present invention provide for an SPA that determines, based on the save command, when to auto-save data. Embodiments of the present invention provide for an SPA that determines whether enough data has changed in order to allow a save command and transfer the data to the server device.

Embodiments of the present invention provide one or more of the following advantages: (i) reduce the number of saves performed by an SPA, (ii) reduce the number of saves performed by an SPA when the SPA has not reached a threshold amount of data input to the SPA or rate of data input to the SPA, (iii) reduce the potential for resources of a server device that saves the data to become overtaxed or reach a critical point that cause issues in performance degradation on the server device, (iv) provide timely auto-saving of data without user intervention, and (v) provide optimal auto-saving frequency or interval that is fair to all clients in terms of server resource usage limitations.

Referring now to various embodiments of the invention in more detail, FIG. 1 is a functional block diagram of a network computing environment, generally designated 100, suitable for operation of backup program 132 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes client device 110A, client device 110B, and server device 130 interconnected over network 120. In embodiments of the invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between client device 110A, client device 110B, and server device 130, and other computing devices (not shown) within network computing environment 100.

Client device 110A is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, client device 110A represents any programmable electronic devices or combination of programmable electronic devices capable of executing machine readable program instructions and communicating with server device 130 and backup program 132, and other computing devices (not shown) within computing environment 100 via a network, such as network 120.

In various embodiments of the invention, client device 110A may be a computing device that can be a standalone device, a management server, a web server, a media server, a mobile computing device, or any other programmable electronic device or computing system capable of receiving, sending, and processing data. In other embodiments, client device 110A represents a server computing system utilizing multiple computers as a server system, such as in a cloud computing environment. In an embodiment, client device 110A represents a computing system utilizing clustered computers and components (e.g. database server computers, application server computers, web servers, and media servers) that act as a single pool of seamless resources when accessed within network computing environment 100.

Client device 110A includes single page application (SPA) 112A. SPA 112A is a website or web application that allows a user of client device 110A to interact with the webpage and write information or data into the current web page without having to reload the entire page from the server. SPA 112A uses a type of code, such as HTML, JavaScript, or CSS, to load and retrieve the webpage. A user can dynamically add information to SPA 112A. In embodiments of the present invention, SPA 112A logs into server device 130. SPA 112A monitors data entered by a user into SPA 112A and save commands that are received from backup program 132. For example, SPA 112A monitors save commands or save intervals received from backup program 132. SPA 112A determines if SPA 112A should save data entered into SPA 112A. If SPA 112A should not save the data, SPA 112A continues to monitor. If SPA 112A determines that the data should be saved, SPA 112A determines if there have been enough changes to data to save the data. If SPA 112A determines there are not enough changes, SPA 112A continues to monitor. If SPA 112A determines there is enough changes to the data to save, SPA 112A transfers the data to server device 130.

Client device 110A includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, client device 110B is substantially similar to client device 110A. In an embodiment, client device 110B includes SPA 112B, which is substantially similar to SPA 112A.

Server device 130 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, server device 130 represents any programmable electronic devices or combination of programmable electronic devices capable of executing machine readable program instructions and communicating with client device 110A, client device 110B, and other computing devices (not shown) within computing environment 100 via a network, such as network 120.

In various embodiments of the invention, server device 130 may be a computing device that can be a standalone device, a management server, a web server, a media server, a mobile computing device, or any other programmable electronic device or computing system capable of receiving, sending, and processing data. In other embodiments, server device 130 represents a server computing system utilizing multiple computers as a server system, such as in a cloud computing environment. In an embodiment, server device 130 represents a computing system utilizing clustered computers and components (e.g. database server computers, application server computers, web servers, and media servers) that act as a single pool of seamless resources when accessed within network computing environment 100.

In various embodiments of the invention, server device 130 includes backup program 132, lightweight directory access protocol (LDAP) repository 134, and database 136.

Embodiments of the present invention provide for backup program 132 that issues save commands to client(s) (e.g., SPA 112A or SPA 112B) that have verified logins based on the determined resources of server device 130. In embodiments of the present invention, backup program 132 receives login verification information from one or more SPAs (e.g., SPA 112A, SPA 112B). Backup program 132 determines resources to monitor based on information in database 134 and receives information about the determined resources from server device 130. Backup program 132 determines whether to issue a save. In an embodiment, backup program 132 may perform an issue save command. An issue save command is one-time command from backup program 132 to an SPA to save the data of the SPA. In another embodiment, backup program 132 may perform an issue save interval. An issue save interval is a one-time command from backup program 132 that creates a new time interval for saving data by an SPA. Backup program 132 notifies the client(s) of the issued save.

In an embodiment, server device 130 includes lightweight directory access protocol (LDAP) repository 134. In an embodiment, LDAP repository 134 may be managed by backup program 132. In an alternative embodiment, LDAP repository 134 may be managed by the operating system of server device 130, another program (not shown), alone, or together with, backup program 132. LDAP repository 134 is a data repository that can store, gather, and/or analyze information. In some embodiments, LDAP repository 134 is located externally to server device 130 and accessed through a communication network, such as network 120. In some embodiments, LDAP repository 134 is stored on server device 130. In some embodiments, LDAP repository 134 may reside on another computing device (not shown), provided that LDAP repository 134 is accessible by server device 130. LDAP repository 134 includes, but is not limited to, user identification and associated passwords, login credentials, login timing information, logoff timing information, clientID information, etc.

In an embodiment, server device 130 includes database 136. In an embodiment, database 136 may be managed by backup program 132. In an alternative embodiment, database 136 may be managed by the operating system of server device 130, another program (not shown), alone, or together with, backup program 132. Database 136 is a data repository that can store, gather, and/or analyze information. In some embodiments, database 136 is located externally to server device 130 and accessed through a communication network, such as network 120. In some embodiments, database 136 is stored on server device 130. In some embodiments, database 136 may reside on another computing device (not shown), provided that database 136 is accessible by server device 130. Database 136 includes, but is not limited to, data edited by a user in an SPA, resource monitor information, resource data, resource value ranges, resource acceptable upper limits, resource acceptable lower limits, resource safety rate, last save time information, standard save time interval, current save time interval, etc.

LDAP 134 and database 136 may be implemented using any volatile or non-volatile storage media for storing information, as known in the art. For example, LDAP 134 and database 136 may be implemented with a tape library, optical library, one or more independent hard disk drives, multiple hard disk drives in a redundant array of independent disks (RAID), solid-state drives (SSD), or random-access memory (RAM). Similarly, LDAP 134 and database 136 may be implemented with any suitable storage architecture known in the art, such as a relational database, an object-oriented database, or one or more tables.

Figure 2:
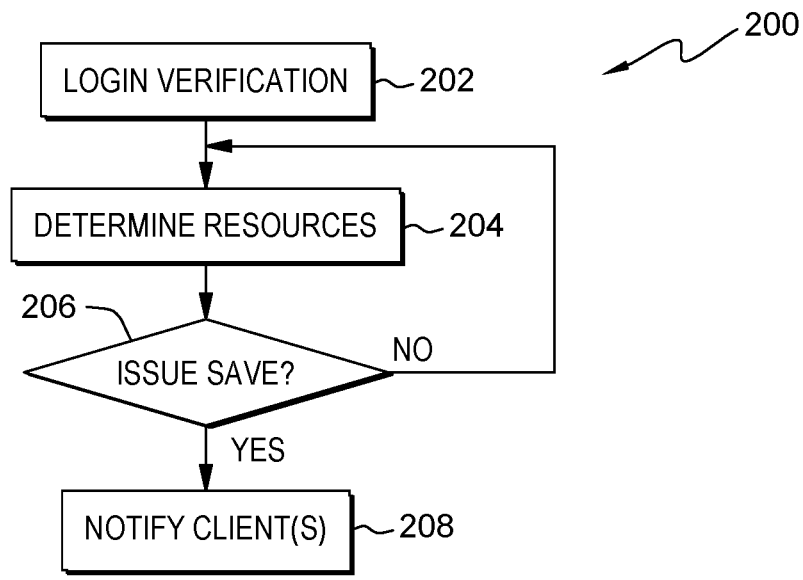
FIG. 2 is a flow chart diagram depicting operational steps for backup program 132, in accordance with at least one embodiment of the invention.

FIG. 2 is a flow chart diagram depicting operational steps of workflow 200 for backup program 132 in accordance with at least one embodiment of the invention. It should be appreciated that embodiments of the present invention provide at least for auto-save commands that are issued from the server side of an SPA, such as server device 130 to SPA 112A on client device 110A. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Backup program 132 provides login verification (step 202). At step 202, backup program 132 provides login verification. In an embodiment, backup program 132 receives login information from one or more of SPA 112A, SPA 112B, or any other SPA (not shown). In an embodiment, backup program 132 receives login information for all SPAs that utilize backup program 132. In an alternative embodiment, backup program 132 continually performs step 202 throughout workflow 200 and receives SPA login information from one or more of SPA 112A, SPA 112B, or any other SPA (not shown) as users of client devices associated with the SPA login to the SPA.

In an embodiment, backup program 132 receives login information in the form of a user identification and an associated password. In an embodiment, the user identification may be a username, a ClientID, login credentials, or any other form of identification that identifies the user. In an embodiment, the login information is, initially, received via user input on a client device (e.g., client device 110A, client device 110B) and transferred from an SPA (e.g., SPA 112A, SPA 112B) to backup program 132. In an embodiment, each set of login information is associated exclusively with a single user. In an alternative embodiment, a set of login information may be associated with one or more users.

In step 202, backup program 132 verifies the login information that is received. In an embodiment, backup program 132 compares the login information received to the login information found in LDAP 134. If the login information is incorrect, in other words the login information does not match the login information found in LDAP 134, backup program 132 notifies the user via the SPA on the client device of the incorrect login information and processing of workflow 200 ends. In this embodiment, the user, via the SPA on the client device, may input login information again. If the login information is correct, backup program 132 may notify the user via the SPA on the client device of the correct login information.

In some embodiments, when the login information is correct for a user, backup program 132 determines if that user has been previously logged in but never subsequently logged out from a session. Here, for example, a user has logged into SPA 112A on client device 110A. However, before logging off of the session on SPA 112A, the same user, using the same login information, logs into SPA 112B on client device 110B. In this embodiment, backup program 132 will issue a forced save command to the SPA (in this example SPA 112A) that the user initially logged into a session for but never logged off of and once the data to be saved is received from SPA 112A, backup program 132 will log the user off of SPA 112A and log the user into the new SPA (in this example SPA 112B).

Backup program 132 determines resources (step 204). At step 204, backup program 132 determines resources to monitor based on data found in database 136. In an embodiment, a user, including but not limited to a system administrator, owner, or operator of server device 130, previously determined the resources that are to be monitored. In an embodiment, the resources to monitor include, but are not limited to, central processing unit (CPU), memory, network traffic, disk I/O, etc.

In an embodiment, backup program 132 determines resource value ranges, resource acceptable upper limits, resource acceptable lower limits, resource safety rate, and last save time information. In an embodiment, a user, including but not limited to a system administrator, owner, or operator of server device 130, previously determined the resource value ranges, resource acceptable upper limits, resource acceptable lower limits, resource safety rate, last save time information. In an embodiment, the resource value range is the range of possible values for the resource. In an embodiment, the resource acceptable upper limit is the upper limit of a resource that, if not exceeded, will allow an auto-save. In an embodiment, the resource acceptable lower limit is the lower limit of a resource that, if below, changes the save interval into a half of it. In an embodiment, the resource safety rate is a value that modifies the current value of a resource in order to add a margin of safety to the resource value. In an embodiment, the last save time information is the last time a specific SPA has saved data to database 136. The resource value ranges, resource acceptable upper limits, resource acceptable lower limits, resource safety rate, and last save time information will be discussed further in reference to FIGS. 5A, 5B, 6A, and 6B.

In step 204, backup program 132 determines the current values of each of the determined resources to monitor. In an embodiment, backup program 132 may query the operating system (not shown) or any other program (not shown) of server device 130 for the current values of the determined resources to monitor. In an embodiment, backup program 132 may determine these resource values at a certain time interval (e.g., one millisecond, one second, or one minute). In an alternative embodiment, the operating system (not shown) or any other program (not shown) of server device 130 may be notified, initially, by backup program 132 of the resources to be monitored, and the operating system (not shown) or any other program (not shown) will notify backup program 132 of the resource values at a certain time interval (e.g., one millisecond, one second, or one minute). In yet another embodiment, the operating system (not shown) or any other program (not shown) of server device 130 may notify backup program 132 of any resources to be monitored if there has been a change from a most recently reported value of the resource to be monitored. In yet another embodiment, the operating system (not shown) or any other program (not shown) of server device 130 may notify backup program 132 of any resources to be monitored if there has been a deviation (e.g., 1%, 10%, 20%, etc.) from the most recently reported value of the resource to be monitored.

Backup program 132 determines whether to issue a save (decision step 206). At decision step 206, backup program 132 determines whether to issue a save to any of the client(s) that are logged in based on the determined resources received in step 204. In an embodiment, every SPA (e.g., SPA 112A and SPA 112B) logged into server device 130 has their saves controlled by backup program 132 and the resources included in server device 130. In an embodiment, a user, including but not limited to, a system administrator, owner, or operator of server device 130 has previously determined whether an SPA will be performing an issue save command or an issue interval command.

In a first embodiment, backup program 132 determines whether to perform an issue save command. In an embodiment, as discussed previously, an issue save command is a one-time command from backup program 132 to an SPA (e.g., SPA 112A) to save the data of the SPA. Backup program 132, for each resource determined in step 204, multiplies the current value of the resource by the safety rate for that value to determine a modified resource value. In an alternative embodiment, backup program 132 uses the current value of the resource without modifying with the safety rate as the determine modified resource value. Backup program 132 then determines whether the modified resource value exceeds the acceptable upper limit for the resource value. If the acceptable upper limit is not exceeded by the modified resource value for all of the resource types, backup program 132 issues a save command and proceeds to step 206. If the acceptable upper limit is exceeded by any of the modified resource values, backup program 132 proceeds to step 204. The save command determination will be discussed further in reference to FIG. 5A.

FIG. 5A is an example issue save command, in accordance with at least one embodiment of the invention. In this example, backup program 132 determines three resource types to be analyzed, CPU, memory and network inbound, as shown in column 502. Backup program 132 then determines, from step 204, the current values of the resource types, as shown in column 508. Here, CPU is at 85%, memory is at 70%, and network inbound is at 55%. Backup program 132 then determines a modified resource value (column 512) by multiplying the current resource value (column 508) by the safety rate (column 510). In an alternative embodiment, a safety rate is not used, so the current resource value (column 508) is used as the modified resource value. Here, the modified resource value is 93.5% for CPU, 73.5% for memory, and 66% for network inbound. Backup program 132 then determines if the acceptable upper limit (column 506) is exceeded by any of the modified resource values (column 512). Here, backup program 132 determines that the modified resource value of CPU (93.5%) exceeds the acceptable upper limit for CPU (90%), therefore, backup program 132 does not issue a save command and processing proceeds to step 204. However, if the modified resource value of CPU was, for example, 80%, then none of the modified resource values would exceed their associated acceptable upper limits, and processing proceeds to step 208.

In a second embodiment, backup program 132 determines whether to perform an issue save interval. In this embodiment, as discussed previously, an issue save interval is a one-time command from backup program 132 that creates a new time interval for saving data by an SPA (e.g., SPA 112A). In an embodiment, a user, including but not limited to a system administrator, owner, or operator of server device 130, determines a standard save time interval. In an embodiment, a standard save interval is a save interval determined by a user, including but not limited to a system administrator, owner, or operator of server device 130. Backup program 132, for each resource determined in step 204, multiplies the current value of the resource by the safety rate for that value to determine a modified resource value. Backup program 132 then determines whether the modified resource value exceeds the acceptable upper limit for the resource value. If backup program 132 determines that all of the modified resource values are below the acceptable lower limits, backup program 132 determines the save interval should be half of the current save interval. If backup program 132 determines that any modified resource value does exceed any of the acceptable upper limits for the resource values, backup program 132 determines the save interval should be double of the current save time interval. If backup program 132 determines that all of the modified resource values are below the acceptable upper limits and above the acceptable lower limits, the current save interval remains the same. In an embodiment, if the current save interval has never been modified, then the current save interval is the standard save interval. Save interval determination will be discussed further in reference to FIG. 6A.

FIG. 6A is an example issue save interval, in accordance with at least one embodiment of the invention. In this example, backup program 132 determines three resource types to be analyzed, CPU, memory and network inbound, as shown in column 602. Backup program 132 then determines, from step 204, the current values of the resource types, as shown in column 610. Here, CPU is at 80%, memory is at 65%, and network inbound is at 40%. Backup program 132 then determines a modified resource value (column 614) by multiplying the current resource value (column 610) by the safety rate (column 612). Here, the modified resource value is 88% for CPU, 74.75% for memory, and 48% for network inbound. Backup program 132 then determines if all of these current values are within the ranges between the upper limit and the lower limit. Here, backup program 132 determines that none of the modified resource values exceed the acceptable upper limits and fall behind the acceptable lower limit, therefore, backup program 132 determines that the current save interval should be kept and processing proceeds to step 208.

Backup program 132 notifies client(s) (step 208). At step 208, backup program 132 notifies client(s) (e.g., SPA 112A, SPA 112B) of a save command or a save interval, depending on the embodiment. In the first embodiment, for the issue save command, backup program 132 determines the client that has the oldest last save time. For example, as shown in FIG. 5B, backup program 132 determines the last save time (column 562) of both Usr01 (e.g., SPA 112A) and Usr02 (e.g., SPA 112B). Backup program 132 determines that the last save time of Us01 is older than the last save time of Usr02, therefore, backup program 132 notifies Usr01 of a save command. In the second embodiment, for the issue save interval, backup program 132 determines the save interval of the client(s). For example, as shown in FIG. 6B, backup program 132 determines the current save interval of the Usr01 and Usr02 (e.g., SPA 112A, 112B) is ten seconds. If in step 206, backup program 132 determined that the save interval should be halved, backup program 132 notifies the client(s) (Usr01 and Usr02 (e.g., SPA 112A, 112B)), that the save interval is now five seconds. If in step 206, backup program 132 determined that the save interval should be doubled, backup program 132 notifies the client(s) (Usr01 and Usr02 (e.g., SPA 112A, 112B)), that the save interval is now twenty seconds.

Figure 3:
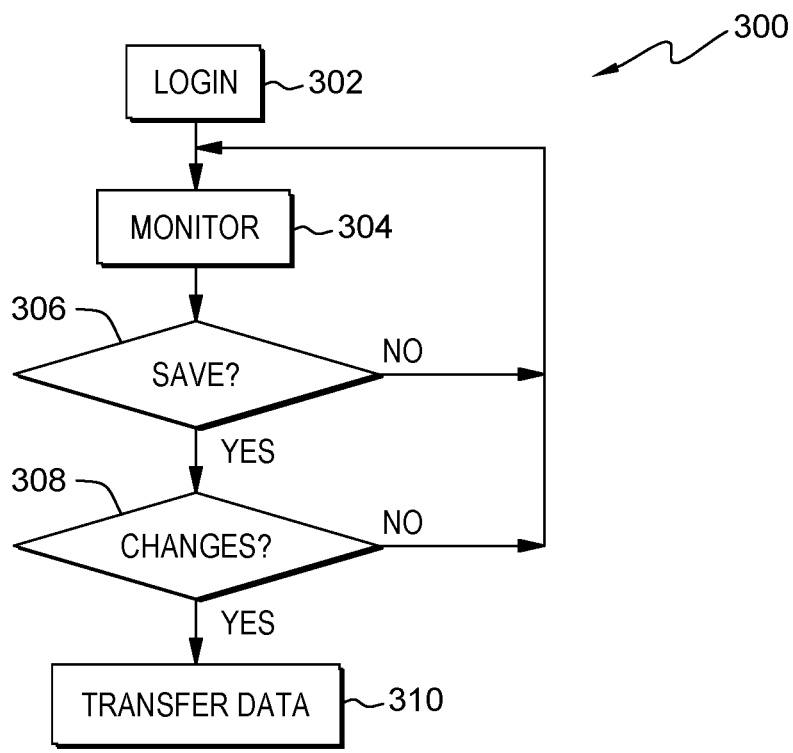
FIG. 3 is a flow chart diagram depicting operational steps for single page application (SPA) 112A or single page application (SPA) 112B, in accordance with at least one embodiment of the invention.

FIG. 3 is a flow chart diagram depicting operational steps of workflow 300 for SPA 112A in accordance with at least one embodiment of the invention. It should be appreciated that embodiments of the present invention provide at least for auto-save commands that are received by a single page application issued from a server side, such as server device 130 to SPA 112A on client device 110A or SPA 112B on client device 110B. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

SPA 112A provides a login (step 302). At step 302, SPA 112A receives login information from a user via a user interface (not shown) on client device 110A. SPA 112A transmits the received login information to backup program 132 on server device 130. Upon supplying incorrect login credentials, SPA program 112A receives, from backup program 132, an indication of the incorrect login credentials and a request for new login credentials. Upon supplying correct login credentials, SPA 112A receives, from backup program 132, an indication of correct login credentials.

SPA 112A provides monitoring (step 304). At step 304, SPA 112A monitors both the data being entered into SPA 112A by a user via a user interface (not shown) and also monitors any indications that are received from backup program 132. In a first embodiment, SPA 112A monitors and determines the total number of characters that have been added to SPA 112A since the last save. In a second embodiment, SPA 112A monitors and determines the rate at which data is being modified in SPA 112A. Here, the rate is determined based on the total number of characters modified compared to the total number of characters in the document.

In some embodiments, SPA 112A receives an indication from backup program 132. In a first embodiment, SPA 112A may receive an indication to issue a force save in a force save command. Here, as discussed previously, the user has logged onto a new SPA (e.g., SPA 112B) without logging off of another data session on an SPA (e.g., SPA 112A). In this embodiment, SPA 112A bypasses steps 306 and 308 and transfers all of the data to server device 130.

SPA 112A determines whether to save (decision step 306). At decision step 306, SPA 112A determines whether to save. In a first embodiment, if SPA 112A, during step 304, receives an issue save command, then SPA 112 determines it is time to save data (decision step 306, yes branch) and processing proceeds to decision step 308. In a second embodiment, if SPA 112A, during step 304, receives an issue save interval command and determines whether the time interval has elapsed since the last save. In this embodiment, SPA 112A determines the save interval and determines whether that interval has elapsed since the last save by SPA 112A. In a simple example, the new save interval may be three seconds, and the last save was done five seconds ago, therefore, SPA 112A will determine it is time to save. In another version of the second embodiment, SPA 112A may not receive an updated/new/different save interval from a previous save interval, however, SPA 112A will continuously monitor the save interval and the time since the last save. Here, when the save interval matches the time since last save, SPA 112A will determine it is time to save the data (decision step 306, yes branch) and processing proceeds to decision step 308. In an embodiment, if SPA 112A determines not to save (decision step 306, no branch), processing proceeds to step 304.

SPA 112A determines whether there are enough changes to the data to save the data (decision step 308). At step 308, SPA 112A determines whether a user has entered more data than a threshold into SPA 112A, and if so, SPA 112A determines the data should be transmitted to backup program 132 on server device 130. In a first embodiment, SPA 112A determines the number of added characters that have been input into SPA 112A since the last save. Here, SPA 112A determines whether the number of added characters is greater than a threshold. If so, then SPA 112A determines that the data should be transferred (decision step 308, yes branch) and processing proceeds to step 310. In a second embodiment, SPA 112A determines the rate of data being modified. Here, SPA determines whether the rate of data change is greater than a threshold. If so, then SPA 112A determines that the data should be transferred (decision step 308, yes branch) and processing proceeds to step 310. In either embodiment, if the number of added characters or rate of data being modified is less than their respective thresholds, SPA 112A determines that the data should not be transferred (decisions step 308, no branch) and processing proceeds to step 304. In an alternative embodiment, if the number of added characters or rate of data being modified is less than their respective thresholds, SPA 112A determines that the data should not be transferred (decisions step 308, no branch), SPA 112A notifies backup program 132, and backup program 132 notifies the next qualifying SPA to backup their data.

SPA 112A transfers the data (step 310). At step 310, SPA 112A transfers the data in SPA 112A to backup program 132 on server device 130. In an embodiment, SPA 112A may transfer all data that has been entered into SPA 112A. In an alternative embodiment, SPA 112A may transfer only the data that has changed from the most recent previous save.

Figure 4:
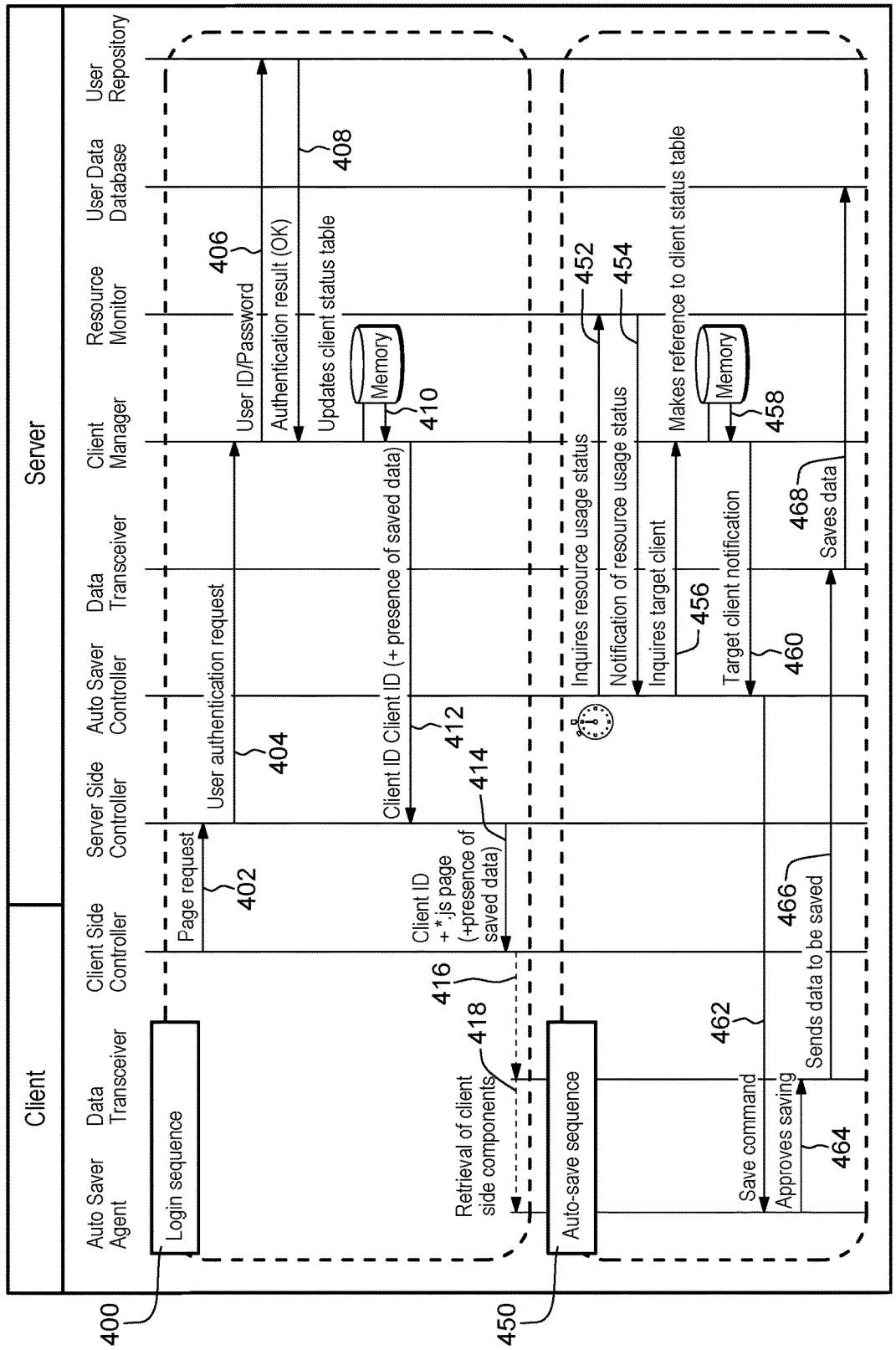
FIG. 4 is sequence diagram of steps for a save command for a single page application (SPA) and backup program 132, in accordance with at least one embodiment of the invention.

FIG. 4 is sequence diagram of steps for a save command for an SPA and a backup program, in accordance with at least one embodiment of the invention. This sequence diagram will be discussed in respect to SPA 112A, SPA 112B and backup program 132. In an embodiment, SPA 112A and SPA 112B perform the actions related to the client side of the overall sequence diagram (i.e., auto-saver agent, data transceiver, client side controller, etc.). In an embodiment, backup program 132 performs the actions related to the server side of the overall sequence diagram (i.e., server side controller, auto-saver controller, data transceiver, client manager, resource monitor, user data database, user repository, etc.) In the sequence diagram, operations performed in login sequence 400 generally relate to SPA 112A login verification by backup program 132. Here, SPA 112A, via a user, generally, will make a page request 402 on the SPA 112A which triggers a user authentication request 404. The user ID/password which was entered in SPA 112A in step 302, then is provided in step 406 from Client Manager to User Repository (e.g., LDAP server). This is similar to step 302, discussed above. Backup program 132 then provides authentication results 408, confirming the user ID/password is correct, similar to step 202. Backup program 132 then updates the client status table 410, indicating the user is logged in. Backup program 132 provides saved data 412 from previous sessions associated with the user ID/password to SPA 112A. Here, SPA 112A will load the client ID data 414 and retrieve any client-side components needed 418.

In the sequence diagram, operations performed in auto-save sequence 450 generally relate to the auto-save of data by SPA 112A and the determination of when to save by backup program 132. Here, backup program 132 inquiries about the resource usage status 452 from server device 130 and receives a notification of resource usage status 454. Backup program 132 determines whether to issue a save command or save interval and determines a target client 456, references the client status table 458 to determine which client to notify of the save, and notifies said client 460 (e.g. SPA 112A) of the save command. SPA 112A receives the save command 462 and determines whether to save, similar to step 308. SPA 112A then approves saving 464 and transmits the data to be saved 466 to backup program 132 on server device 130. Backup program 132 then saves the data 468.

Figure 7:
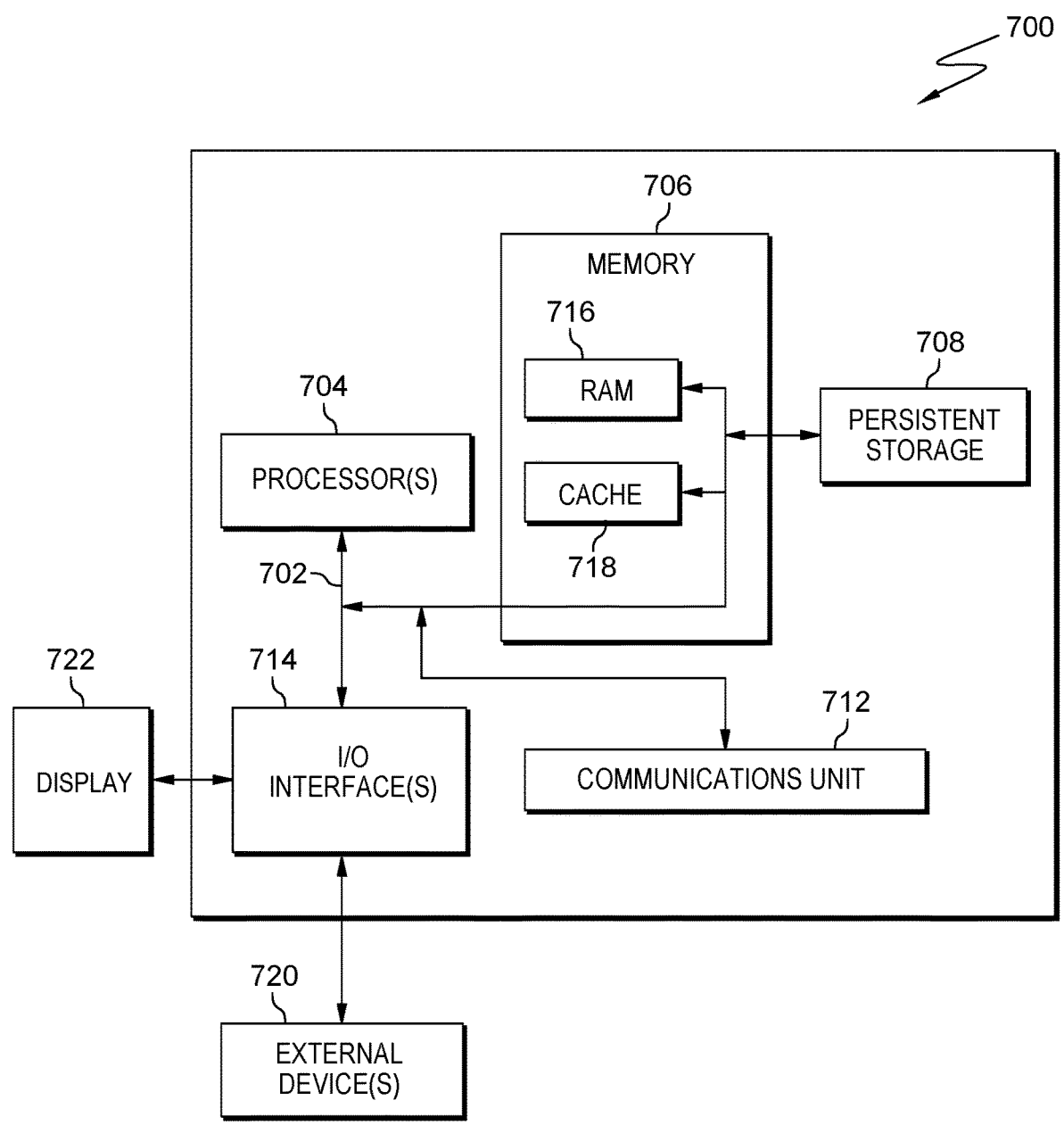
FIG. 7 is a block diagram depicting components of a computer, generally designated 700, suitable for executing backup program 132, in accordance with at least one embodiment of the invention.

FIG. 7 is a block diagram depicting components of a computer 700 suitable for video backup program 132, in accordance with at least one embodiment of the invention. FIG. 7 displays the computer 700, one or more processor(s) 704 (including one or more computer processors), a communications fabric 702, a memory 706 including, a RAM 716, and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and input/output (I/O) interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a random-access memory (RAM) 716 and a cache 718. In general, the memory 706 may comprise any suitable volatile or non-volatile one or more computer readable storage media.

Program instructions for backup program 132 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of the persistent storage 708.

The communications unit 712, in these examples, provides for communications with other data processing systems or devices. In these examples, the communications unit 712 may comprise one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allow for input and output of data with other devices that may operate in conjunction with the computer 700. For example, the I/O interface 714 may provide a connection to the external devices 720, which may be as a keyboard, keypad, a touch screen, or other suitable input devices. External devices 720 may also include portable computer readable storage media, for example thumb drives, portable optical or magnetic disks, and memory cards. Software and data used to practice embodiments of the present invention may be stored on such portable computer readable storage media and may be loaded onto the persistent storage 708 via the I/O interface(s) 714. The I/O interface(s) 714 may similarly connect to a display 722. The display 722 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for auto-saving data, the method comprising the steps of:
   determining, by one or more computer processors, one or more resources of a first computing device to monitor based on a single page application of a second computing device;

determining, by the one or more computer processors, a value for each resource of the one or more resources;

determining, by the one or more computer processors, an upper threshold for each resource of the one or more resources; and responsive to determining that each resource of the one or more resources is below the upper threshold for each resource of the one or more resources, issuing, by the one or more computer processors, the save command to the single page application based on the determined value of each resource of the one or more resources.

2. The computer-implemented method of claim 1, wherein the one or more resources are at least one of: central processing unit (CPU), memory, network traffic, and disk I/O.

3. The computer-implemented method of claim 1, further comprising:

receiving, by the one or more computer processors, an indication from the single page application, wherein the indication has determined that data being modified on the single page application is below a threshold; and responsive to receiving the indication, issuing, by the one or more computer processors, a second save command to a second single page application of a third computing device.

4. A computer program product for auto-saving data, the computer program product comprising:

one or more computer readable storage media; and program instructions stored on the one or more computer readable storage media, the program instructions comprising:

program instructions to determine one or more resources of a first computing device to monitor based on a single page application of a second computing device;

program instructions to determine a value for each resource of the one or more resources;

program instructions to determine a lower threshold for each resource of the one or more resources;

responsive to determining that each resource of the one or more resources is below the lower threshold for each resource of the one or more resources, program instructions to determine a new save interval, wherein the new save interval is half of a standard save interval; and program instructions to transfer the new save interval to the single page application.

5. The computer program product of claim 4, wherein the one or more resources are at least one of: central processing unit (CPU), memory, network traffic, and disk I/O.

6. A computer system for auto-saving data, the computer system comprising:

one or more computer processors;

one or more computer readable storage media; and program instructions stored on the one or more computer readable storage media for execution by at least one of the one or more computer processors, the program instructions comprising:

program instructions to determine one or more resources of a first computing device to monitor based on a single page application of a second computing device;

program instructions to determine a value for each resource of the one or more resources;

program instructions to determine an upper threshold for each resource of the one or more resources;

responsive to determining that any resource of the one or more resources is above the upper threshold, program instructions to determine a new save interval, wherein the new save interval is double of a standard save interval; and program instructions to transfer the new save interval to the single page application.

7. The computer system of claim 6, wherein the one or more resources are at least one of: central processing unit (CPU), memory, network traffic, and disk I/O.

* * * * *